US007742916B2

(12) United States Patent
Barriac et al.

(10) Patent No.: US 7,742,916 B2
(45) Date of Patent: Jun. 22, 2010

(54) METHOD AND DEVICES FOR EVALUATING TRANSMISSION TIMES AND FOR PROCESSING A VOICE SIGNAL RECEIVED IN A TERMINAL CONNECTED TO A PACKET NETWORK

(75) Inventors: Vincent Barriac, Trelevern (FR); Jean-Yves Le Saout, Trelevern (FR); Patrick Losquin, Lannion (FR)

(73) Assignee: France Telecom, Paris (FR)

( * ) Notice: Subject to any disclaimer, the term of this patent is extended or adjusted under 35 U.S.C. 154(b) by 646 days.

(21) Appl. No.: 10/564,243

(22) PCT Filed: Jun. 17, 2004

(86) PCT No.: PCT/FR2004/001636

§ 371 (c)(1),
(2), (4) Date: Jul. 3, 2006

(87) PCT Pub. No.: WO2005/015889

PCT Pub. Date: Feb. 17, 2005

(65) Prior Publication Data

US 2006/0277051 A1    Dec. 7, 2006

(30) Foreign Application Priority Data

Jul. 11, 2003    (FR) .................................... 03 50329

(51) Int. Cl.
    *G01L 19/00*    (2006.01)
(52) U.S. Cl. .................. 704/217; 704/201; 370/395.21; 370/517; 455/67.16
(58) Field of Classification Search ................. 704/217, 704/233, 270.1; 370/231, 519, 352, 395.21, 370/355, 356; 455/67.16
See application file for complete search history.

(56) References Cited

U.S. PATENT DOCUMENTS 5,708,704 A * 1/1998 Fisher .................... 379/406.08

(Continued)

FOREIGN PATENT DOCUMENTS

FR    2 733 867    11/1996

(Continued)

OTHER PUBLICATIONS

T.A. Hall, Objective speech quality measures for internet telephony, in: Voice over IP (VoIP) Technology, Proceedings of SPIE, vol. 4522, Denver, CO, USA, Aug. 2001, pp. 128-136.*

(Continued)

*Primary Examiner*—Talivaldis I Smits
*Assistant Examiner*—Greg A Borsetti
(74) *Attorney, Agent, or Firm*—Cohen Pontani Lieberman & Pavane LLP

(57) ABSTRACT

A method for evaluating the processing delay of a speech signal contained in data packets received in a receiver terminal having a telephony module during a voice call to a terminal sending the data packets over a packet-switched network. The method includes the step of obtaining from the received data packets a stream of audio packets containing the speech signal. Within a predetermined decoding time, the stream of obtained audio packets is decoded and a first reconstituted speech signal is created. At least a portion of the speech reconstituted by the telephony module is duplicated to create a second reconstituted speech signal. The time difference between the first and the second reconstituted speech signals is determined. The processing delay of the speech signal in the receiver terminal is calculated from at least the determined time difference between the reconstituted first and second speech signals and the predetermined decoding time.

23 Claims, 3 Drawing Sheets

U.S. PATENT DOCUMENTS

| | | | |
|---|---|---|---|
| 6,118,763 A * | 9/2000 | Trumbull | 370/231 |
| 6,181,716 B1 * | 1/2001 | Lide | 370/519 |
| 6,205,125 B1 * | 3/2001 | Proctor et al. | 370/328 |
| 6,226,266 B1 * | 5/2001 | Galand et al. | 370/235 |
| 6,272,539 B1 * | 8/2001 | Cuomo et al. | 709/223 |
| 6,321,264 B1 * | 11/2001 | Fletcher et al. | 709/224 |
| 6,370,163 B1 * | 4/2002 | Shaffer et al. | 370/519 |
| 6,512,746 B1 * | 1/2003 | Sand | 370/252 |
| 6,545,979 B1 * | 4/2003 | Poulin | 370/241.1 |
| 6,665,271 B1 * | 12/2003 | Thomas et al. | 370/252 |
| 6,795,452 B2 * | 9/2004 | Iancu | 370/515 |
| 7,162,011 B2 * | 1/2007 | Kolligs et al. | 379/1.04 |
| 7,304,962 B1 * | 12/2007 | Kirla et al. | 370/289 |
| 2002/0064158 A1 | 5/2002 | Yokoyama et al. | |
| 2002/0120458 A1 | 8/2002 | Silfvast | |
| 2003/0053601 A1 * | 3/2003 | Kollings et al. | 379/1.04 |
| 2004/0034492 A1 * | 2/2004 | Conway | 702/81 |
| 2005/0157705 A1 * | 7/2005 | Galetto et al. | 370/352 |

FOREIGN PATENT DOCUMENTS

| | | | |
|---|---|---|---|
| FR | EP0741471 A1 * | 11/1996 | |
| WO | WO 9501022 A1 * | 1/1995 | |
| WO | WO 0145291 A1 * | 6/2001 | |

OTHER PUBLICATIONS

J.-C. Bolot, "End-to-end packet delay and loss behavior in the Internet," Proc. SIGCOMM'93 San Francisco, CA: ACM, pp. 289-298, Sep. 1993.*

Scheets, G. et al., "Analyzing end-to-end delivery delay in pure VoIP Networks", 45th Midwest Symposium on Circuits and Systems, Conference Proceedings, vol. 2, pp. 517-520, Aug. 4, 2002.

Psytechnics Ltd., "Estimating E-model Id within a VoIP network", Technical Note, pp. 1-4, 2002.

Le Garrec, Frédéric et al., "Deliverable D2.4 The needs of Consolidation", Information Society Technologies, Jun. 20, 2003.

* cited by examiner

METHOD AND DEVICES FOR EVALUATING TRANSMISSION TIMES AND FOR PROCESSING A VOICE SIGNAL RECEIVED IN A TERMINAL CONNECTED TO A PACKET NETWORK

RELATED APPLICATIONS

This is a U.S. National Phase Application under 35 USC 371 of International Application PCT/FR2004/001636, filed on 17 Jun. 2004.

FIELD OF THE INVENTION

The present invention relates generally to packet-switched networks, such as the Internet, and more particularly to telephony over IP networks.

To be more precise, the invention relates to a method of evaluating the processing delay of a speech signal contained in data packets received in a receiver terminal equipped with a telephony module during a voice call via a packet-switched network with a sender terminal sending the data packets. The invention further relates to a method of evaluating the end-to-end transmission delay of a speech signal received in a receiver terminal, that end-to-end transmission delay including the speech signal processing delay referred to above. The invention also relates to devices for implementing the methods referred to above.

BACKGROUND OF THE INVENTION

The increased possibilities of contacting and communicating with anybody, anywhere, at any time and for an insignificant cost, and the possibility of making local calls via the worldwide interconnection network provided by the Internet have developed a taste for telephony over packet-switched networks and more particularly for telephony over Internet Protocol (IP) networks.

Unlike conventional fixed network telephony over the public switched telephone network, the quality of telephony over a packet-switched network, in particular over an IP network, is usually mediocre, there being no guaranteed minimum quality level.

This lack of a guaranteed voice quality in telephony over an IP network is inherent to the design of the network, which gives priority to interconnecting the parties, to the detriment of the bandwidth finally allocated to the speech signal, the only criterion in terms of allocated bandwidth that is permitted being a best effort criterion. In particular, the bit rate of the information transmitted in the form of digital packets representing speech signals decreases as more and more users of the IP network log onto the network to use it for IP telephony or other purposes.

The deployment of satisfactory IP telephony services therefore necessitates control of the quality of the services offered and in particular necessitates the use of tools to measure that quality.

The main defects of IP telephony transmission, also known as Voice over IP (VoIP) transmission, are as follows:

Long delays, linked to routing delays and network equipment processing delays, which can impede interactivity and therefore make conversation between the calling and called parties difficult, if not impossible.

The effect of jitter on the packet routing delay, i.e. statistical variance of the transmission delay, reflected in varying time intervals between packet arrival times.

Loss of packets, caused either by the elimination of packets during routing when their lifetime has expired as a result of router congestion or by them reaching the remote terminal with too great a delay, in which case they are destroyed on arrival.

Echo, linked primarily to long and extremely variable delays.

Distortion caused by coding speech signals in digital packets at a low bit rate, as is generally the case in VoIP.

The end-to-end transmission delay of the speech signal represents the cumulative result of all the delays generated in the speech signal transmission and processing chain. As such, it constitutes the delay actually perceived by the user, and is sometimes called the mouth to ear delay.

The end-to-end transmission delay is therefore made up of the transmission delay over the packet mode (IP, ATM—Asynchronous Transfer Mode) network and the processing and transmission delays in the IP terminating equipments (IP telephone, gateway, local area network).

The transmission delay over the packet mode network takes into account the processing delay in the equipment and in particular in the routers. That processing delay depends in particular on the number of units the signals pass through, the functions implemented in those units (proxy, transcoding, firewall, etc.), and the available bandwidth.

The processing delay in the terminating equipment and networks takes into account the delays introduced by the audio codec (coder/decoder), the jitter buffer, packetization, voice activity detection, etc., and where applicable transmission over a transmission network or circuit mode access network. The processing delay in the terminating equipment and networks can be broken down into a send portion and a receive portion.

It can therefore be very useful to measure the end-to-end transmission delay in the context of evaluating the quality of voice calls over the packet-switched network, because the measured transmission delay can be correlated with the quality level perceived by the user. Consequently, if limiting values, in terms of perceived quality, for the end-to-end transmission delay are known, action may be taken at the level of network engineering or terminating equipment configuration with a view to keeping the end-to-end transmission delay within acceptable limits.

The end-to-end transmission delay of a speech signal is typically measured intrusively, i.e. by setting up test calls between two probes simulating or substituted for the terminals.

The transmission delay as such is measured by comparing the signal sent by a sender probe and the signal received by a receiver probe. It is essential that the two signals are recorded using the same clock and that the two probes are synchronized.

The test signals used for these measurements can be speech signals, composite signals or single frequencies.

Probes available off the shelf that use this kind of intrusive measurement include those using the perceptual evaluation of speech quality (PESQ) psycho-acoustic model standardized by Recommendation P.862 of the ITU-T (International Telecommunications Union), for example.

Evaluating the end-to-end transmission delay by means of intrusive probes has two drawbacks. Firstly, the measurements obtained do not relate to real calls between users. Secondly, they do not take account of processing of the speech signal in the real terminals of users. Consequently, this type of evaluation can be used to characterize the quality of a telephone service in a general way but not to characterize the voice quality of real calls between two users.

Accordingly, given the increasing expansion of IP telephony, there is a real need for tools for evaluating the voice quality actually perceived by the user of a Voice over IP telephone terminal during real telephone calls. There is also a correlated need for tools for non-intrusively evaluating the real processing delay for a speech signal received in a terminal, and thereafter the end-to-end transmission delay for a speech signal during real calls between two IP terminating equipments, such as IP telephones (known as IPphones) or PCs equipped with IP telephony software (known as softphones).

SUMMARY OF THE INVENTION

An object of the present invention is to meet this need. To this end, a first aspect of the invention is directed to a method of evaluating the processing delay of a speech signal contained in data packets received in a receiver terminal equipped with a telephony module during a voice call to a terminal sending said data packets over a packet-switched network. This method includes the following steps:

- obtaining from the received data packets a stream of audio packets containing the speech signal;
- within a predetermined decoding time, decoding the stream of audio packets obtained and creating a first reconstituted speech signal;
- the telephony module duplicating at least a portion of the reconstituted speech signal constituting a second speech signal;
- determining the delay difference between the first speech signal and the second speech signal; and
- calculating the processing delay D3 of the speech signal in the receiver terminal from at least the measured delay difference between said first speech signal and said second speech signal and the predetermined decoding time.

This method provides a tool for evaluating the processing delay of a speech signal in a receiver terminal connected to a packet-switched network non-intrusively, i.e. during real calls. This tool can therefore contribute to evaluating the voice quality actually perceived by a telephone terminal user.

According to one particular feature of the invention, the measured delay difference between said first and second speech signals is measured by intercorrelation of the envelope signals of said first and second speech signals.

A second aspect of the invention is directed to a method of evaluating the end-to-end transmission delay of a speech signal received in a receiver terminal during a voice call to a terminal sending said speech signal over a packet-switched network. This method is remarkable in that it includes a step of evaluating the processing delay of the speech signal in the receiver terminal by an evaluation method as succinctly defined above.

According to a particular feature of the invention, the method of evaluating the transmission delay of a speech signal further includes the following steps:

- evaluating the send processing delay D1 of the speech signal;
- measuring the transmission delay D2 of the speech signal in the network; and
- evaluating the end-to-end transmission delay from the send processing delay D1, the transmission delay D2 and the receive processing delay D3.

The above method of evaluating the end-to-end transmission delay is an effective tool for evaluating the voice quality perceived by the user of a telephone terminal during real calls, in particular because it is non-intrusive.

The invention further relates to a device adapted to be installed in a terminal for voice communication over a packet-switched network and including means for implementing the method or methods of the invention succinctly defined above.

In a preferred embodiment of the invention, the above device takes the form of program modules executed in an electronic data processing system constituting or incorporated in terminating equipment for voice communication over a packet-switched network. Consequently, the present invention is also directed to a computer program stored on an information medium, the program being adapted to execute the above method or methods when it is loaded into and executed in an electronic data processing system.

The advantages of the above device and the above computer program are identical to those of the methods of the invention briefly explained above.

BRIEF DESCRIPTION OF THE DRAWINGS

Other features and advantages of the invention will become more apparent upon reading the following description of the invention, which is given with reference to the appended drawings, in which.

DETAILED DESCRIPTION OF THE DRAWINGS

Figure 1:
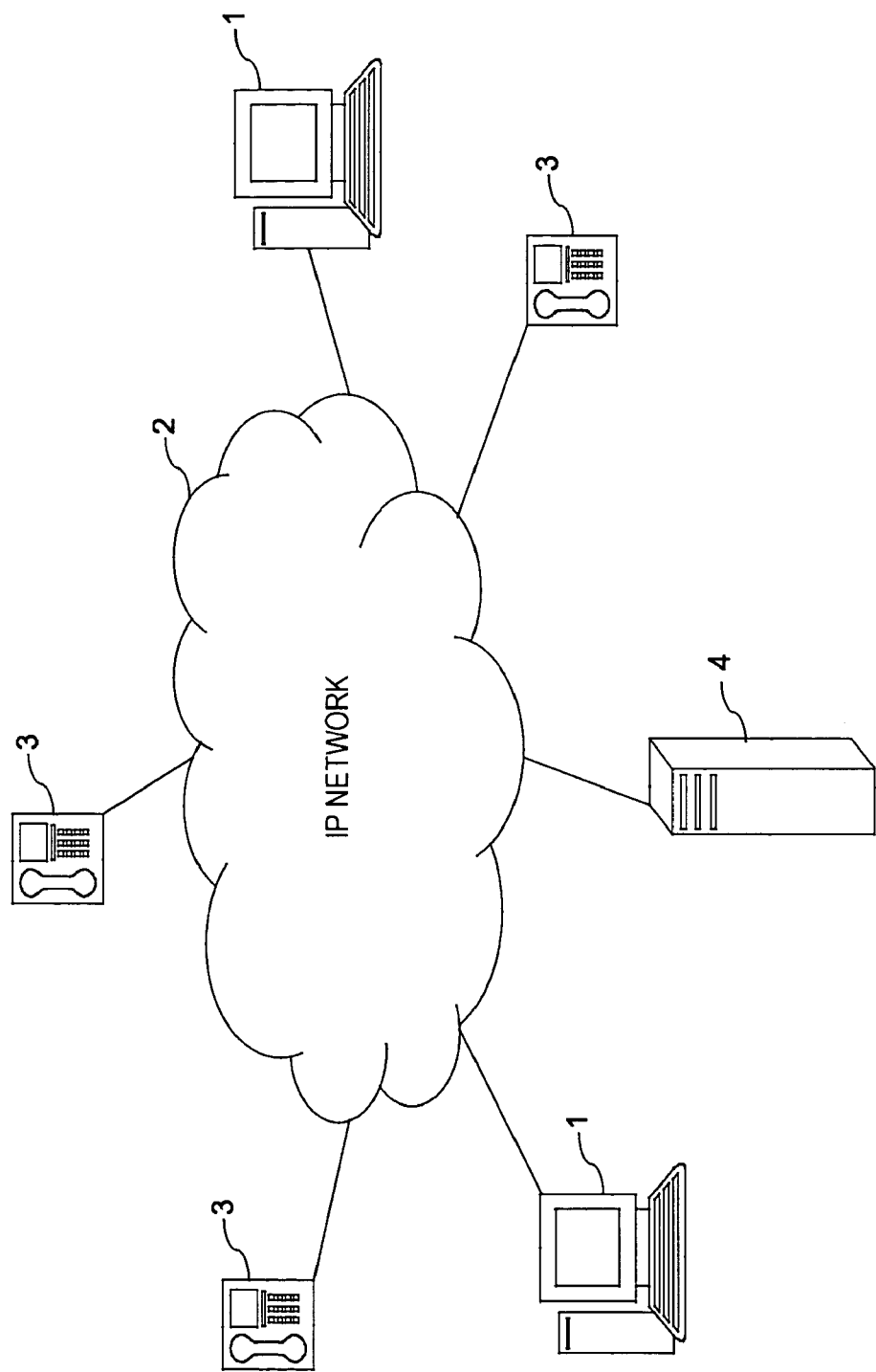
FIG. 1 is a diagram of one example of a packet-switched network to which the present invention may be applied.

FIG. 1 represents a packet-switched network 2 using a stack of protocols based on the Internet Protocol (IP) and usually referred to as an IP network. However, the invention applies to any packet-switched network based on an IP type protocol.

To the network 2 are connected IP terminal equipments 1, 3, 4, certain of which are able to set up Voice over IP (VoIP) calls and are usually referred to as IP terminals, for example IP telephones 3 or multimedia personal computers (PC) 1 equipped with appropriate telephone software, while other equipments, for example a server 4, provide particular services on the network.

To simplify the explanation of the invention, FIG. 1 shows only one network 2, although the network 2 may encompass a certain number of subnetworks associated with gateway and/or router type equipments for interconnecting those subnetworks and thereby enabling end-to-end IP communication between the IP terminals.

The above subnetworks typically include a public switched telephone network (PSTN) and local area networks (LAN), e.g. Ethernet networks.

In a preferred embodiment, the IP terminals 1, 3 communicate with each other using the set of communication protocols defined in Recommendation H.323 of the International Telecommunications Union (ITU-T). For more information on this set of protocols, see the website www.itu.org.

In a different embodiment, the IP terminals 1, 3 communicate with each other using the Session Initiation Protocol (SIP) architecture of the Internet Engineering Task Force (IETF). For more information on this architecture, see the website www.ietf.org.

Of course, the invention is in no way limited to the above two protocol families and to the contrary applies to any protocol architecture supporting Voice over IP.

As explained in more detail later, the server 4 is a collection server for recovering quality information relating to voice calls set up in the IP terminals 1, 3. In particular, this information includes end-to-end transmission delay values obtained in accordance with the invention.

To this end, each IP terminal 1, 3 is equipped with a device of the invention for evaluating the end-to-end transmission delay of a speech signal reconstituted in the terminal from IP data packets received during a call.

Figure 2:
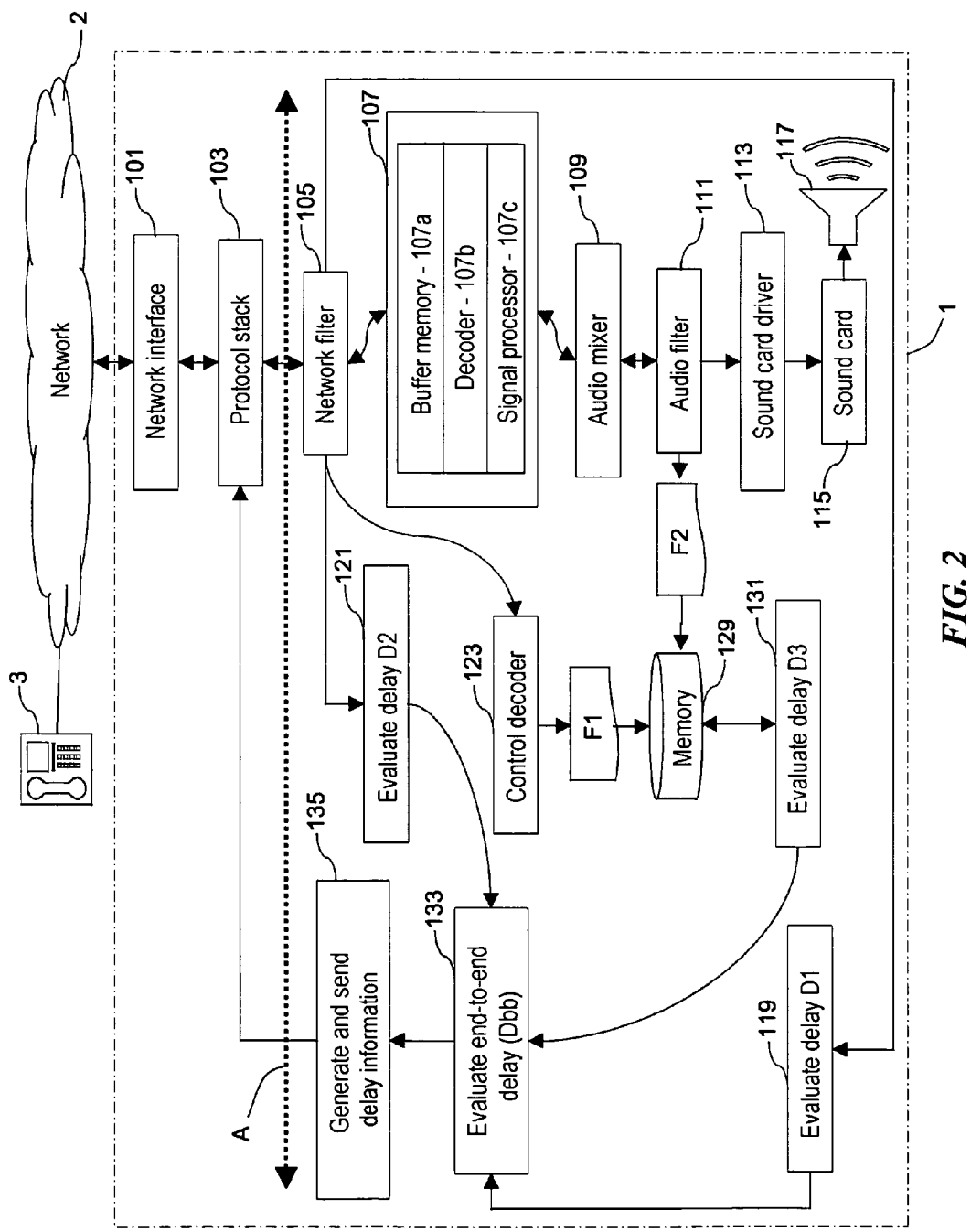
FIG. 2 is a diagram of an IP telephone terminal comprising, in accordance with the invention, means for evaluating the processing delay for a speech signal received in the terminal and means for evaluating the end-to-end transmission delay of the speech signal.

FIG. 2 is a diagram of an IP telephony terminal comprising, in accordance with the invention, means for evaluating the processing delay of a speech signal received in the terminal and means for evaluating the end-to-end transmission delay of the speech signal.

The above means, constituting a device of the invention, are incorporated into an IP telephony terminal. In this embodiment, the IP terminal in question is a multimedia personal computer (PC) 1 on which a telephony application has been installed.

The terminal 1 equipped in accordance with the invention includes a set of essentially software modules 101-135. A certain number of these modules are conventionally included in the terminal, namely:
- a network interface 101;
- a protocol manager 103, also referred to as a protocol stack;
- a telephony application 107;
- an audio mixer 109;
- a sound card driver 113;
- a sound card 115;
- at least one loudspeaker 117; and
- an application programming interface (API) A.

The other modules are specific to the present invention and comprise:
- a network filter module 105;
- an audio filter module 111;
- a "control" audio decoder module 123;
- storage means 129;
- a module 119 for evaluating the send processing delay D1 for a speech signal received in the terminal 1;
- a module 121 for evaluating the network transmission delay D2 for the speech signal received in the terminal 1;
- a module 131 for evaluating the receive processing delay D3 of the speech signal;
- a module 133 for evaluating the end-to-end transmission delay from the above delays D1, D2 and D3; and
- a module 135 for generating and sending delay information over the network to a collection server.

The network interface 101 conventionally includes a network card and components needed for the terminal 1 concerned to be able to log onto the network 2 and receive electrical signals conveying coded information. Those components include in particular a modem (modulator/demodulator).

The network interface delivers as output a stream of IP packets containing in particular digitized voice frames.

The IP packets are then taken over by the protocol manager 103 and subjected to protocol disencapsulation processing appropriate to the set of communication protocols (protocol stack) used on top of the Internet Protocol.

Protocol disencapsulation typically yields:
- call request signaling messages;
- call request negotiation messages;
- a stream of audio data packets; and
- a stream of call control data packets.

In a preferred embodiment using the H.323 protocol set, the call signaling messages conform to the H.225.0 call signaling protocol, the call negotiation messages conform to the H.245 negotiation protocol, the audio packet stream containing digitized audio signal frames conforms to the real time protocol (RTP), and the stream of call control data packets conforms to the real time control protocol (RTCP). The RTP and RTCP are both used on top of the User Datagram Protocol (UDP).

In another preferred embodiment using the Session Initiation Protocol (SIP) architecture protocol set, the call request signaling messages and the call request negotiation messages are contained in messages conforming to the SIP, the audio packet stream containing digitized audio signal frames conforms to the RTP, and the stream of call control data packets conforms to the RTCP.

In one particular embodiment, the operating system of the PC 1 is Windows™ from Microsoft and the protocol manager 103 consists of the Winsock function library. The set of standardized functions provided by the Winsock library enables TCP/UDP-IP applications to run in Windows™, independently of the hardware used.

On leaving the protocol stack 103, the various streams of messages and data packets, i.e. the call request signaling messages, the call request negotiation messages, the stream of audio data packets, and the stream of call control data packets, are delivered to the network filter module 105 (described below).

The API (A in FIG. 2) is provided by the operating system of the terminal 1 and enables electronic data processing applications designed to access the network to access it via the protocol manager 103 using a library of standardized primitives or functions. These primitives thus enable the applications to access the communication protocols installed in the terminal and to receive and send data.

As mentioned above, in the case of an implementation conforming to the H.323 protocols, the following data streams are obtained at the output of the protocol manager 103:
- a stream of call request signaling messages conforming to the H.225.0 protocol;
- a stream of call request negotiation messages conforming to the H.245 negotiation protocol; and
- a stream of data packets conforming to the UDP, the UDP packets including audio data packets conforming to the RTP and call control data packets conforming to the RTCP.

The above streams of information are typically delivered to the input of the telephony application 107. In the embodiment described here, the telephony application used is NetMeeting™ from Microsoft.

In accordance with the present invention, the device of the invention includes a network filtering module 105 between the protocol manager module 103 and the telephony module 107.

The module 105 is transparent with respect to data streams leaving the protocol manager (i.e. it does not modify them). It includes software means, i.e. particular programmed functions, for detecting the setting up of a voice call and identifying the call.

In FIG. 2, a voice call has been set up between the IP telephone 3 and the PC 1. In practice, the network filter 105 detects the setting up of a voice call on receiving a call request signaling message characteristic of setting up a connection conforming to the call request signaling protocol used.

According to the invention, the network filter 105 comprises means for obtaining the stream of audio packets conforming to the RTP containing the speech signal sent by the sending terminal from UDP packets supplied by the protocol stack 103. In practice, the network filter extracts the stream of RTP packets from the stream of UDP packets, duplicates it, and then supplies it to the input of the control decoding module 123.

In one embodiment, the network filter 105 takes the form of a data link library (DLL) which is loaded automatically when an application invokes the Winsock API.

This library communicates with the Winsock protocol manager through particular interfaces provided by Winsock: the API and another interface known as the service provider interface (SPI), which is used to implement each of the various functions constituting the network filter in the form of a layered service provider (LSP).

An instantiation of the network filter is created when the telephony module 107 requests the creation of a network communication channel (socket). To be more precise, a network filter is instantiated when the telephony application invokes the WSPSocket and WSPAccept functions of the Winsock API.

The network filter of the invention is designed to be compatible with a plurality of communication protocols. To this end, it is designed as a generic filter adapted to be instantiated as specific (protocol) filters. These specific filters are adapted to process data transmitted in accordance with different protocols of the same level or protocols of a particular family of protocols (SIP, H.323).

The control decoder 123 is an audio decoder, for example of the G.711 type, identical to that used in the telephony module 107. In this way, the control decoder processing time Tdec is the same as that of the telephony module. However, a decoder different from that of the telephony module can be used instead, provided that the processing delay difference between the two decoders is constant and known.

The function of the control decoder 123 is to decode the stream of RTP audio packets supplied by the network filter 105 within a decoding time that is predetermined because it is known in advance. A reconstituted speech signal, typically in the form of samples in the pulse code modulation (PCM) format, is therefore obtained at the output of the control decoder module.

The reconstituted speech signal is then saved in the memory 129 in the form of a data file F1. That memory can be a portion of the memory space of a hard disc, for example, or a particular region of a random-access memory (RAM).

Referring again to FIG. 2, the streams of data leaving the protocol manager 103 (Winsock) are supplied to the telephony (NetMeeting) module 107 via the network filter 105, which does not modify this data.

The telephony module 107 conventionally includes, in addition to the audio decoder 107b, a jitter buffer 107a and a signal processing unit 107c (comfort noise generation, echo cancellation, level adjustment, etc.).

In operation, the telephony module 107 extracts RTP packets from the stream of UDP packets it receives and then extracts from them the digitized and encoded audio signal frames. The audio signal is then reconstituted using the audio decoder 107b, after which it is processed by the signal processing unit 107c (jitter, echo, etc.).

The telephony module delivers at its output a reconstituted audio signal, typically in the form of samples in the pulse code modulation (PCM) format.

The PCM coded voice samples are then delivered to the audio mixer 109 which applies predefined adjustments to the speech signal with a view to its acoustic reproduction, and the speech signal leaving the audio mixer is therefore the final audio signal that is converted into sound and therefore heard by the user of the terminal 1.

It will be noted here that the delay introduced by the audio mixer is negligible compared to the overall processing delay of the speech signal in the receiver terminal 1.

The audio signal reconstituted by the telephony module 107 is supplied to the input of the audio filter module 111 of the invention via the audio mixer. This filter module samples the audio signal reconstituted by the telephony module and stores it in the memory 129 in a second data file F2.

The audio filter 111 is activated synchronously with the network filter 105, so that storage of the file F1 on leaving the control decoder 123 and of the file F2 on leaving the audio filter 109 are effected either simultaneously or at different times determined by the same clock, the exact difference between these times being known.

Like the network filter, the audio filter 111 does not modify the audio signal that it receives and, in conjunction with the network filter, it samples, i.e. copies, at least a portion of the reconstituted speech signal (stream of PCM samples), just before delivering it to the sound card 115 via the sound card driver 113. The reconstituted speech signal is finally converted by a digital-to-analog converter on the sound card into an electrical signal that is converted into acoustic waves by the loudspeaker 117.

In practice, the Windows Driver Model (WDM) architecture is used to implement the audio filter 111. This architecture enables interfacing with device drivers belonging to the same class, representing the same type of device. Data addressed to a particular device of that class can then be filtered. Using this architecture, the audio filter is implemented by installing a MEDIA class device driver which is automatically loaded when the Windows™ operating system is started up.

Referring again to FIG. 2, according to the invention, the receiver terminal 1 comprises a module 131 for evaluating the processing delay of the received speech signal. This module receives at its input, from the memory 129, the speech signal F1 decoded by the control decoder module 123 and the speech signal F2 decoded by the telephony module 107. In the context of the present explanation of the invention, the processing delay of the speech signal received in the terminal 1 is denoted D3.

According to the invention, the module 131 for evaluating the delay D3 comprises a certain number of submodules. It includes a voice activity detection submodule, not shown in FIG. 2, for measuring the level of voice activity in each of the stored voice signals F1 and F2. Voice activity detection algorithms are well known in the art. As will be explained below with reference to FIG. 3, the remainder of the process for evaluating the processing delay D3 is carried out if the voice activity detected in the first and second speech signals F1 and F2 is above a predetermined threshold.

The module 131 for evaluating the delay D3 further includes a submodule (not shown) for determining the delay difference between the two speech signals F1 and F2. In accordance with the invention, the delay difference between the signals F1 and F2 that is determined takes account of the processing delay difference for the stream of RTP packets leaving the network filter 105 and processed by the telephony module 107 and the control decoder module 123.

Because the processing delays of the control decoder 123 and the decoder 107b are identical or very close, the measured delay difference represents the cumulative delay introduced by the buffer 107a and the signal processing unit 107c, which is inherently variable and therefore difficult to measure directly.

Finally, the module 131 includes a submodule (not shown) for calculating the overall processing delay D3 of the speech signal in the form of RTP streams received in the communication terminal 1. As is explained below with reference to FIG. 3, the delay D3 is evaluated taking into account the measured value of the delay difference between the signals F1 and F2.

The communication terminal 1 of the invention further comprises a module 121 for evaluating the transmission delay D2 in the network 2 of the speech signal received in the terminal 1. The method of the invention for evaluating the delay D2 is described in more detail with reference to FIG. 3.

The terminal 1 further comprises a module 119 for evaluating the processing delay D1 introduced when the sender terminal sent the speech signal that has been received in the terminal 1. In practice, the delay D1 corresponds to the speech signal coding delay in the sending terminal. The method of the invention of evaluating the delay D1 is also described in more detail below with reference to FIG. 3.

The above delays D1, D2, D3 evaluated by the invention are supplied to the module 133 for evaluating the end-to-end transmission delay of the speech signal received in the terminal 1. According to the invention, the module 133 computes the end-to-end delay Dbb from the send processing delay D1, the transmission delay D2, and the receive processing delay D3. The computation of the delay Dbb is described in more detail below with reference to FIG. 3.

Finally, the terminal 1 of the invention comprises a module 135 for generating and sending delay information. The module 135 recovers each of the end-to-end delay values obtained by the module 133 and generates information representing the end-to-end delay values obtained. This information is grouped in the form of transmission quality tickets, for example, each corresponding to one or more voice calls set up in the communication terminal 1 concerned.

These transmission quality tickets are then sent over the network to a collection server 4 for managing end-to-end delay information sent by a set of communication terminals connected to the network.

Quality tickets are transmitted over the network via the protocol manager 103 and the network interface 101. In a preferred embodiment, each quality ticket is incorporated in a TCP message sent via the IP network 2.

The collection server 4 processes quality tickets sent by a set of communication terminals 1, 3 connected to the network in order to evaluate the transmission quality of speech signals received in all the terminals. The collection server therefore receives generated quality tickets for each terminal from the set of communication terminals equipped with a device of the invention, either periodically or after each voice call.

In one embodiment, the collection server generates from the received tickets a line of text for each received ticket in a transmission quality measurement report that is stored in the server. The information in this quality report can then be viewed by a human operator via an appropriate man-machine interface, for example a graphical user interface displayed on a computer screen. The displayed information can then be used to supervise the quality of service in relation to the Voice over IP offer on the network.

The method of the invention of evaluating the end-to-end transmission delay of a speech signal, including the method of the invention of evaluating the processing delay of a speech signal received in a communication terminal, is described next with reference to FIG. 3.

Figure 3:
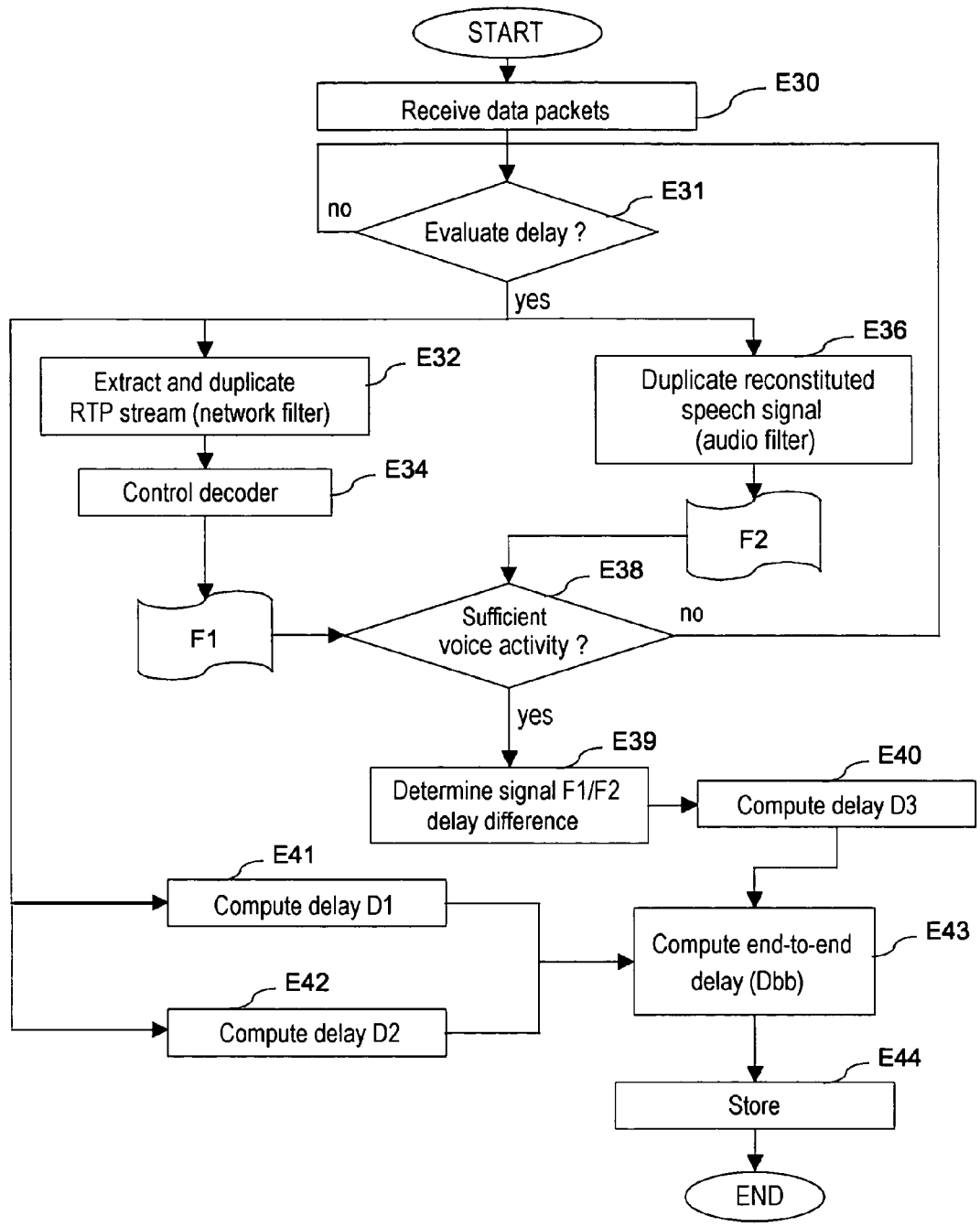
FIG. 3 is a flowchart of a method of the invention of evaluating the end-to-end transmission delay of a speech signal.

In FIG. 3, in the step E30, the data packets (UDP packets) containing the speech signal are supplied by the protocol stack 103 to the network filter 105 which uses a timer to determine the times required for evaluating the end-to-end transmission delay.

Thus the purpose of the above timer is to time these delay evaluations. In one embodiment, the evaluation rate is set at one evaluation every 15 seconds. In another embodiment, the evaluation is effected in the form of a burst of measurements to obtain an average value of the delay measurements at a given time.

If the delay must be evaluated (E31, yes), in the step E32, the network filter 105 extracts from the UDP stream the RTP packets containing the speech frames and copies that stream of packets.

In the step E34, the stream of RTP audio packets duplicated by the network filter is supplied to the control decoder module 123 which reconstitutes a speech signal from them. The reconstituted speech signal is then saved in the file F1.

In parallel with this, in the step E36, the audio filter 111 duplicates the speech signal reconstituted by the telephony module 107 and saves it in the file F2.

The audio signal from the control decoder 123 and the audio signal from the audio filter 111 are preferably stored at the same time in the file F1 and the file F2, respectively.

It will be noted here that, to simplify the explanation, the audio signals referred to above are designated by the names of the files that contain them, that is to say F1 and F2.

In the present, embodiment, extraction of audio data by the network filter and the audio filter is halted after a predetermined time, which in one embodiment is five seconds.

In the step E38, the module 131 for evaluating the processing delay D3 measures the vocal activity of the speech signals F1 and F2 and then compares the measured values to a predetermined voice activity threshold that in practice is set at 30%. In the step E39, the delay difference between the two speech signals F1 and F2 is determined only if the vocal activity measured in the two signals F1 and F2 is above the predetermined threshold.

Consequently, in the present embodiment, the delay difference between the two speech signals F1 and F2, each sampled over five seconds, is determined (E39) if the voice activity of those signals exceeds 30% (E38, yes). Otherwise (E38, no), the process returns to the step E31. This voice activity criterion verifies whether the two signals contain sufficient speech to enable the delay difference between the two signals to be measured.

In the step E39, the delay evaluation module 131 computes the delay difference between the two speech signals F1 and F2.

In a preferred embodiment the delay difference between the signals F1 and F2 is measured as a function of the inter-correlation of the envelope signals of the signals F1 and F2.

For example, the delay difference between the signals F1 and F2 may be measured using the method described in French Patent document No. 2 733 867 "Procédé et dispositif de mesure sans intrusion de la qualité de transmission d'une ligne téléphonique" ["A method and apparatus for measuring the transmission quality of a telephone line without intrusion"]. The method described in the above document is explained therein with particular reference to FIG. 1a, and is applied to a speech signal and to a corresponding echo signal. In the context of the present invention, the measurement method described in the above document is applied to the speech signals F1 and F2.

Thus, using the method described in the above document, samples of the speech signal F1 from the control decoder are filtered by a low-pass filter over a particular time period and samples of the signal F2 from the audio filter are also filtered, over a time period substantially equal to half that particular time period but offset by half the period, which yields envelope signals of the signals F1 and F2. A plurality of coefficients of the intercorrelation between the signals F1 and F2 is established for successive separate times with a particular time increment. Comparing the intercorrelation coefficients discriminates the intercorrelation coefficient with the highest value for a specific time value that represents the measured delay difference Dt between the signals F1 and F2.

In the step E40, the delay D3 representing the processing delay of the speech signal received in the communication terminal 1 concerned is obtained by summing the measured delay difference Dt between the speech signals F1 and F2 and the predetermined decoding time Tdec of the control decoder 123; in other words D3=Dt+Tdec.

According to the invention, the processing delay D3 of the speech signal received in the terminal is measured in the context of evaluating the end-to-end transmission delay of the speech signal.

To this end, the processing delay D1 on sending the speech signal is evaluated (E41) and the transmission delay D2 of the speech signal in the network is measured (E42), as shown in FIG. 3, during the steps E41 and E42.

In the present embodiment, the processing delay D1 on sending the speech signal is evaluated by consulting a table stored in the receiver terminal. That table stores a predefined maximum value and a predetermined minimum value of the delay D1 for each type of coder used for sending the received speech signal, these predefined values taking into account the payload of the received IP packets.

The sending coder type and the received IP packet payload are identified in the receiver terminal from call request signaling messages contained in the received IP packets. In the present embodiment, the signaling messages conform to the H.225.0 call request signaling protocol.

The method of evaluating the delay D1 described here is described in the document "Estimating E-model Id within a VoIP network, Technical note" from Psytechnics. The method described is derived from ITU-T Recommendation G.114: "TRANSMISSION SYSTEMS AND MEDIA, DIGITAL SYSTEMS AND NETWORKS—One-way transmission time".

It will be noted here that the send coder type (negotiated codec) may equally be obtained from call request negotiation (H.245) messages extracted from the data packets received in the terminal. These call request negotiation messages are extracted by the network filter 105, from which voice call identification information is obtained, in particular the start and end of call times, the codec (audio coder-decoder) negotiated between the calling terminal and the called terminal, the payload of the received IP packets, the identifiers, for example the IP addresses, of the called and calling terminals, and the path linking the two terminals via the network.

The table below gives a list of the best case and worst case encoding delays D1 for three of the most widely used VoIP codecs. This table is taken from the above Psytechnics document.

| Codec | D1, best case (ms) | D1, worst case (ms) |
|---|---|---|
| G.711 | Packet_size | Packet_size + 0.125 |
| G.729 | Packet_size + 5 | Packet_size + 5 + 10 |
| G.723.1 | Packet_size + 7.5 | 2 * Packet_size + 7.5 + 30 |

In practice, in most situations, the send encoding delay D1 will be closer to the best case delay and consequently a reasonable estimate of the coding delay D1 is the minimum (best case) value +20%.

In this evaluation, the time that elapses between the moment at which a packet is ready to send in the sender terminal and the time at which it appears on the transmission line is insignificant and is therefore ignored.

Accordingly, knowing the send codec type and the payload of the IP packets, it is possible to estimate the coding delay (send processing delay) within a range of delays.

Referring again to FIG. 3, once the send encoding delay D1 has been computed, it is supplied to the module 133 for evaluating the end-to-end delay, as shown in the step E43.

The transmission delay D2 of the speech signal in the network is evaluated in the step E42. In a preferred embodiment of the invention, this delay is evaluated by either of two alternative methods.

The first is to use sender report (SR) packets in the RTCP packets contained in the UDP frames of the received IP packets. The transmission delay D2 from the sender terminal to the receiver terminal can easily be calculated from the information contained in the SR packets. For more details on the method of calculating this delay from the information contained in the SR packets, see the Internet Engineering Task Force (IETF) document RFC 1889. See in particular therein item 6.3.2, which is associated with FIG. 2 of the document, which is entitled "Example for round-trip time computation".

An alternative method is used to evaluate the transmission delay D2 on the network if the SR packets are not available during the call because the sender terminal or the telephone application of the sender terminal does not allow it, because the voice call is too short, or for any other reason leading to the absence of sending reports in the packets received.

In a preferred embodiment of the invention, the alternative method uses the utility program Ping, which uses the echo function of the Internet Control Message Protocol (ICMP), details of which can be found in the IETF document RFC792.

In the context of the present invention, the receiver terminal 1 sends a small packet over the network to the IP address of the sender terminal 3. The receiver terminal 1 then waits for a return (echo) packet from the sender terminal 3. Then, by halving the time that elapses between sending the Ping packet and receiving the echo packet, an evaluation is obtained of the average transmission delay D2 over the network between the sender terminal and the receiver terminal.

As for the delay D1, once the transmission delay D2 over the network has been calculated, it is supplied to the module 133 for evaluating the end-to-end delay in the step E43.

In the step E43, the end-to-end transmission delay Dbb is calculated from the send processing (encoding) delay D1, the transmission delay D2 over the network, and the receive processing delay D3. In practice, the end-to-end delay is obtained by summing the calculated values of the delays D1, D2, D3.

Finally, in the step E44, the calculated end-to-end delay value is stored so that it may be sent over the network to a collection server, if necessary, as explained above with reference to FIG. 2. If this is the case, the following steps (not shown in FIG. 3) are executed:

information representing the obtained end-to-end delay values is created; and end-to-end delay information is sent over the network to a collection server adapted to manage end-to-end delay information sent by a set of communication terminals connected to the network.

To summarize, the present invention relates in particular to a method of evaluating the processing delay of a speech signal contained in data packets received in a receiver terminal equipped with a telephony module during a voice call over a packet-switched network to a terminal sending the data packets. The invention also relates to a method of evaluating the end-to-end transmission delay of a speech signal received in a receiver terminal, that end-to-end delay including the above speech signal processing delay.

In the embodiment described above, the steps of these methods are determined by computer program instructions and are executed when these programs are loaded into a computer, or more generally an electronic data processing system, the operation of which is then controlled by the execution of the programs.

Consequently, the invention applies equally to computer programs adapted to implement the invention, especially computer programs on or in an information medium. These programs may use any programming language and take the form of source code, object code or an intermediate code between source code and object code, such as a partially compiled form, or any other form that is desirable for implementing a method of the invention.

The information medium may be any entity or device capable of storing the program. For example, the medium may include storage means, such as a ROM, for example a CD-ROM or a semiconductor ROM, or magnetic storage means, for example a diskette (floppy disc) or a hard disc. Also, the above medium may be a transmissible medium such as an electrical or optical signal, which may be carried by an electrical or optical cable, by radio waves or by other means; in particular, a program according to the invention may be downloaded via the Internet.

Alternatively, the information medium may be an integrated circuit into which the program is incorporated, the circuit being adapted to execute or to be used in the execution of the method in question.

The invention also relates to voice call terminal equipment equipped with a device of the invention, such as an IP telephone or a multimedia PC equipped with telephony software. The invention relates more generally to any IP terminal equipment equipped with a delay evaluation device of the invention.

Of course, the present invention is in no way limited to the embodiments described and shown here, but to the contrary encompasses all variants that will be evident to the person skilled in the art.

The invention claimed is:

1. A method for evaluating a processing delay of a speech signal contained in data packets received in a receiver terminal during a voice call to a terminal sending said data packets over a packet-switched network, the receiver terminal having a telephony module which generates a reconstituted speech signal from the received data packets, said method comprising the steps of:
   obtaining, at the receiver terminal, a stream of audio packets from the received data packets and decoding the audio packet stream within a predetermined decoding time to reconstitute a first speech signal from the received packets of the audio stream;
   duplicating, at the receiver terminal, at least a portion of the speech signal reconstituted by the telephony module to constitute a second speech signal;
   determining, at the receiver terminal, a time difference between the first speech signal and the second speech signal; and
   calculating, at the receiver terminal, the processing delay of the speech signal contained in the data packets received in the receiver terminal from at least the determined time difference between said first and second speech signals and said predetermined decoding time.

2. The method according to claim 1, wherein the determined time difference between said first and second speech signals is measured by intercorrelation of envelope signals of said first and second speech signals.

3. The method according to claim 1, wherein the step of determining the time difference is preceded by a step of detecting vocal activity in the first and second speech signals, the determining and calculating steps being executed if vocal activity detected in the first and second signals is above a predetermined threshold.

4. The method according to claim 1, wherein said decoding within a predetermined decoding time implements one of a decoding algorithm identical to that implemented in said telephony module and a constant and known decoding time difference relative to the algorithm implemented in the telephony module.

5. The method according to claim 1, wherein the processing delay is obtained by summing the determined time difference between the first and second speech signals and the predetermined decoding time of the first speech signal.

6. The method according to claim 1, wherein said packet switching network is an IP network and the data packets received in the terminal are IP packets.

7. A method according to claim 1, further comprising the step of:
   evaluating the calculated processing delay of the speech signal in the terminal to evaluate end-to-end transmission delay of the speech signal contained in the data packets received in the receiver terminal during the voice call to the terminal sending said speech signal over the packet-switched network.

8. The method according to claim 7, further comprising:
   evaluating the processing delay of the speech signal sent over the packet-switched network;
   measuring the transmission delay of the speech signal in the packet-switched network; and
   evaluating the end-to-end transmission delay from said processing delay of the speech signal sent over the packet-switched network, said transmission delay of the speech signal in the packet-switched network and said processing delay of the speech signal received in the receiver terminal.

9. The method according to claim 8, wherein the processing delay of the speech signal sent over the packet-switched network is evaluated by consulting a table stored in the receiver terminal containing a predefined maximum value and a predefined minimum value of said processing delay of the speech signal sent over the packet-switched network for each type of speech signal send coder, predefined maximum values accounting for payload of received IP packets.

10. The method according to claim 8, wherein the transmission delay of the speech signal in the packet-switched network is evaluated using a Ping technique.

11. The method according to claim 8, wherein the transmission delay of the speech signal in the packet-switched network is evaluated from sender report information extracted from the received data packets.

12. The method according to claim 7, wherein the end-to-end transmission delay is evaluated by summing send processing delay of the speech signal sent over the packet-switched network, said transmission delay of the speech signal in the packet-switched network and said processing delay of the speech signal received in the receiver terminal.

13. The method according to claim 7, further comprising the steps of:
creating information representing obtained end-to-end delay values; and
sending said created end-to-end delay information over the packet-switched network to a collection server configured to manage end-to-end delay information sent by a plurality of communication terminals connected to the network.

14. A device for evaluating a processing delay of a speech signal contained in data packets received in a receiver terminal during a voice call to a terminal sending said data packets over a packet-switched network, the receiver terminal having a telephony module which generates a reconstituted speech signal from the received data packets, said device comprising:
a network filter module configured to obtain, at the receiver terminal, a stream of audio packets from the received data packets;
a control decoder module having a predetermined decoding time for decoding the stream of audio packets obtained and for reconstituting a first speech signal from the received packets of the audio stream;
an audio filter module configured to duplicate, at the receiver terminal, at least a portion of the speech signal reconstituted by the telephony module, the duplicated portion of the speech signal constituting a second speech signal;
means for determining, at the receiver terminal, a time difference between the first speech signal and the second speech signal; and
means for calculating, at the receiver terminal, the processing delay of the speech signal contained in data packets received in the receiver terminal from at least the determined time difference between said first and second speech signals and the predetermined decoding time.

15. The device according to claim 14, wherein the time difference between the first speech signal and the second speech signal is measured by intercorrelation of the envelope signals of first and second speech signals.

16. The device according to claim 14, further comprising:
means for evaluating the calculated processing delay of the speech signal contained in data packets received in the terminal to evaluate end-to-end transmission delay of the speech signal during the voice call to the terminal sending said data packets over the packet-switched network, said evaluating means being configured for installation the receiver terminal having the telephony module.

17. Telephone terminal equipment on a packet-switched network, said telephone terminal equipment including a device for evaluating the end-to-end transmission delay of a speech signal as claimed in claim 16.

18. The telephone terminal equipment on a packet-switched network as clamed in claim 17, wherein said telephone terminal equipment comprises an IP telephone or a personal computer having telephony software.

19. Telephone terminal equipment on a packet-switched network, said telephone terminal equipment including a device for evaluating the processing delay of a speech signal as claimed in claim 14.

20. The telephone terminal equipment on a packet-switched network as clamed in claim 19, wherein said telephone terminal equipment comprises an IP telephone or a personal computer having telephony software.

21. The device according to claim 14, further comprising:
means for detecting vocal activity in the first and second speech signals, the time difference between the first and second speech signals being determined if detected vocal activity is above a predetermined threshold.

22. A computer-readable storage medium encoded with a computer program executed by a computer that causes evaluation of a processing delay of a speech signal contained in data packets received in a receiver terminal during a voice call to a terminal sending said data packets over a packet-switched network, the receiver terminal having a telephony module which generates a reconstituted speech signal from the received data packets, the computer program comprising:
program code for obtaining, at the receiver terminal, a stream of audio packets from the received data packets and decoding the audio packet stream within a predetermined decoding time to reconstitute a first speech signal from the received packets of the audio stream;
program code for duplicating, at the receiver terminal, at least a portion of the speech signal reconstituted by the telephony module to constitute a second speech signal;
program code for determining, at the receiver terminal, a time difference between the first speech signal and the second speech signal; and
program code for calculating, at the receiver terminal, the processing delay of the speech signal contained in the data packets received in the receiver terminal from at least the determined time difference between said first and second speech signals and said predetermined decoding time.

23. A computer-readable storage medium encoded with a computer program executed by a computer that causes evaluation of a processing delay of a speech signal contained in data packets received in a receiver terminal during a voice call to a terminal sending said data packets over a packet-switched network, the receiver terminal having a telephony module which generates a reconstituted speech signal from the received data packets, the computer program comprising:
program code for obtaining, at the receiver terminal, a stream of audio packets from the received data packets and decoding the audio packet stream within a predetermined decoding time to reconstitute a first speech signal from the received packets of the audio stream;
program code for duplicating, at the receiver terminal, at least a portion of the speech signal reconstituted by the telephony module to constitute a second speech signal;
program code for determining, at the receiver terminal, a time difference between the first speech signal and the second speech signal; and
program code for calculating, at the receiver terminal, the processing delay of the speech signal contained in the data packets received in the receiver terminal from at least the determined time difference between said first and second speech signals and said predetermined decoding time; and
program code for evaluating the calculated processing delay of the speech signal in the terminal to evaluate end-to-end transmission delay of the speech signal contained in the data packets received in the receiver terminal during the voice call to the receiver terminal sending said speech signal over the packet-switched network.

* * * * *